US012393023B2

(12) United States Patent
Baleine et al.

(10) Patent No.: US 12,393,023 B2
(45) Date of Patent: Aug. 19, 2025

(54) OPTICAL ABERRATION COMPENSATION LENS USING GLASS-CERAMICS AND METHOD OF MAKING

(71) Applicants: Lockheed Martin Corporation, Bethesda, MD (US); University of Central Florida Research Foundation, Inc., Orlando, FL (US)

(72) Inventors: Clara R. Baleine, Orlando, FL (US); Myungkoo Kang, Orlando, FL (US); Guy Love, Hurst, TX (US); Kathleen A. Richardson, Geneva, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 703 days.

(21) Appl. No.: 17/628,720

(22) PCT Filed: Jul. 22, 2020

(86) PCT No.: PCT/US2020/043016
§ 371 (c)(1),
(2) Date: Jan. 20, 2022

(87) PCT Pub. No.: WO2021/016318
PCT Pub. Date: Jan. 28, 2021

(65) Prior Publication Data
US 2022/0260830 A1 Aug. 18, 2022

Related U.S. Application Data

(60) Provisional application No. 62/877,523, filed on Jul. 23, 2019.

(51) Int. Cl.
*G02B 27/00* (2006.01)
*C03B 25/02* (2006.01)
(Continued)

(52) U.S. Cl.
CPC .......... *G02B 27/0025* (2013.01); *C03B 25/02* (2013.01); *C03B 32/02* (2013.01);
(Continued)

(58) Field of Classification Search
None
See application file for complete search history.

(56) References Cited

U.S. PATENT DOCUMENTS

2013/0278999 A1 10/2013 Carlie
2013/0342921 A1* 12/2013 Sunne .................. B82Y 20/00
977/831
(Continued)

FOREIGN PATENT DOCUMENTS

WO 2018073295 A1 4/2018

OTHER PUBLICATIONS

Kang, et al., "Monolithic Chalcogenide Optical Nanocomposites Enable Infrared System Innovation: Gradient Refractive Index Optics," Advanced Optical Materials, 2020, vol. 8, 11 pages.
(Continued)

*Primary Examiner* — Bao-Luan Q Le
*Assistant Examiner* — Danell L Owens
(74) *Attorney, Agent, or Firm* — Terry M. Sanks, Esq.; Beusse Sanks, PLLC (57) ABSTRACT

Disclosed herein is an optical aberration compensation lens using glass-ceramics and a method of making the same. The method of manufacturing the optical aberration compensation lens includes applying at least one heat treatment to a base glass material of a base composition to form a glass-ceramic material with a volume filling fraction of one or more species of nanocrystals. This process is glass composition agnostic and can be applied to generate any glass-ceramic composition formed through controlled nucleation and growth. In certain embodiments, the species and/or
(Continued)

volume filling fraction of nanocrystals determines the resulting index of refraction and dispersion characteristic. Accordingly, application of different heat treatments (e.g., nucleation temperature, growth temperature, and/or treatment times) to the same base glass material produces different glass-ceramic materials with different optical properties (e.g., index of refraction and/or dispersion characteristic).

19 Claims, 9 Drawing Sheets

(51) Int. Cl.
  *C03B 32/02* (2006.01)
  *C03C 4/10* (2006.01)
  *C03C 10/00* (2006.01)
  *G02B 13/14* (2006.01)

(52) U.S. Cl.
  CPC ............... *C03C 4/10* (2013.01); *C03C 10/00* (2013.01); *G02B 13/14* (2013.01); *C03C 2204/00* (2013.01); *G02B 2207/101* (2013.01)

(56) References Cited

U.S. PATENT DOCUMENTS

| | | |
|---|---|---|
| 2015/0219893 A1 | 8/2015 | Chen et al. |
| 2016/0238746 A1* | 8/2016 | Baleine .................. C03B 32/02 |
| 2017/0242158 A1 | 8/2017 | Muhr et al. |
| 2018/0339934 A1 | 11/2018 | Baleine et al. |

OTHER PUBLICATIONS

Nagar, et al., "Apochromatic singlets enabled by metasurface-augmented GRIN lenses," Optica, vol. 5, Issue 2, Feb. 2018, Optical Society of America, pp. 99-102.

Richardson, et al., "Advances in infrared gradient refractive index (GRIN) materials: a review," Optical Engineering, vol. 59, Issue 11, Nov. 2020, 29 pages.

Sisken, et al., "Infrared Glass-Ceramics with Multidisperson and Gradient Refractive Index Attributes," Advanced Function Materials, vol. 20, 2019, 13 pages.

Sisken, et al., "Laser-Induced Crystallization Mechanisms in Chalcogenide Glass Materials for Advanced Optical Functionality," Doctoral Dissertation, Fall 2017, University of Central Florida, 223 pages.

International Search Report and Written Opinion for International Patent Application No. PCT/US2020/043016, mailed Nov. 10, 2020, 11 pages.

Kang, et al., "Ultralow Dispersion Multicomponent Thin-Film Chalcogenide Glass for Broadband Gradient-Index Optics," Advanced Materials, vol. 30, Issue 39, Aug. 13, 2018, pp. 1-9.

* cited by examiner

OPTICAL ABERRATION COMPENSATION LENS USING GLASS-CERAMICS AND METHOD OF MAKING

RELATED APPLICATION

This application is a 35 U.S.C. § 371 national phase filing of International Application No. PCT/US2020/043016, filed Jul. 22, 2020, entitled "OPTICAL ABERRATION COMPENSATION LENS USING GLASS-CERAMICS AND METHOD OF MAKING," which claims the benefit of U.S. Provisional Patent Application No. 62/877,523, filed on Jul. 23, 2019, entitled "OPTICAL ABERRATION COMPENSATION LENS USING GLASS-CERAMICS AND METHOD OF MAKING," the disclosures of each of which are hereby incorporated herein by reference in their entireties.

TECHNICAL FIELD

The embodiments relate to optical aberration compensation lenses, and in particular, to optical aberration compensation lenses using glass-ceramics and methods of making.

BACKGROUND

Figure 1:
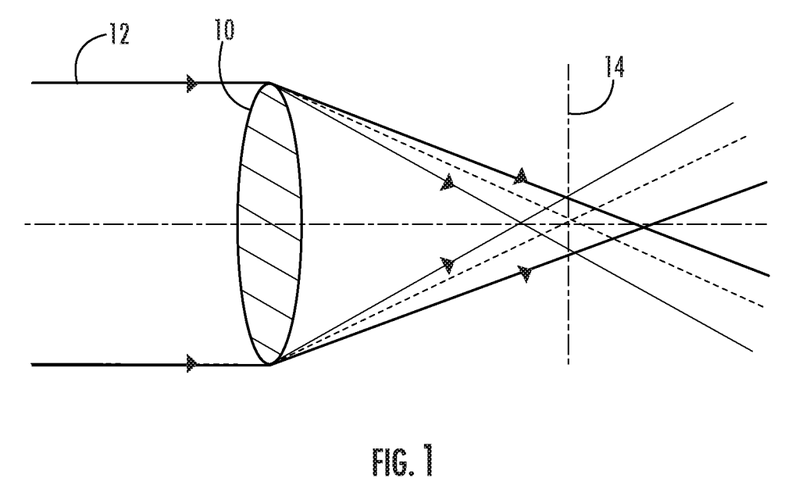
FIG. 1 is a side view of a lens illustrating formation of a chromatic aberration.

Lenses with different dispersion properties (e.g., change in refractive index as a function of wavelength) are typically combined to reduce or eliminate aberrations (e.g., wavelength related aberrations), such as shown in FIG. 1. In particular, FIG. 1 illustrates a lens 10 generating chromatic dispersion with deviations in the light paths 12 of differing colors propagated through the lens 10 to produce a chromatic aberration at an imaging plane 14.

For example, crown glass and flint glass are typically combined (e.g., achromatic doublet with concave flint lens and convex crown lens) to form a pair of glasses that serves to compensate for chromatic aberrations. Each element possesses different refractive index and dispersion properties, such that the dispersion of these glasses partially compensate for each other. However, crown and flint glasses are typically based on oxide materials and operate in the visible spectrum, and cannot operate or transmit infrared.

Similar materials are needed in the infrared spectrum, especially to compensate for chromatic aberrations throughout the entire infrared spectrum, e.g., from short wave infrared (SWIR) to long wave infrared (LWIR) (e.g., from 1 to 12 μm). However, there are few materials that can transmit over this entire range. As a result, manufacturing such materials can be complicated and expensive. Also, complications and costs associated with scaling up of multiple infrared materials can be very high. Further, infrared optical systems tend to require many lenses to compensate for aberrations, such as chromatic and monochromatic (e.g., spherical, coma, astigmatism, etc.) aberrations, making such systems large, bulky, and cumbersome.

SUMMARY

Disclosed herein is an optical aberration compensation lens using glass-ceramics and a method of making the same. The method of manufacturing the optical aberration compensation lens includes applying at least one heat treatment to a base glass material of a base composition (i.e., starting composition) to form a glass-ceramic material with a volume filling fraction of one or more species of nanocrystals. This process is glass composition agnostic (e.g., oxide, non-oxide, etc.) and can be applied to generate any glass-ceramic composition formed through controlled nucleation and growth. In certain embodiments, the species and/or volume filling fraction of nanocrystals determines the resulting index of refraction and dispersion characteristic (e.g., constringence). Accordingly, application of different heat treatments (e.g., nucleation temperature, growth temperature, and/or treatment times) to the same base glass material produces different glass-ceramic materials with different optical properties (e.g., index of refraction and/or dispersion characteristic).

In one embodiment, an optical aberration compensation lens includes a glass-ceramic material having a volume filling fraction of one or more species of nanocrystals configured to compensate for at least one aberration of at least one lens. In certain embodiments, the glass-ceramic material includes an index of refraction and a dispersion characteristic configured to compensate for the one or more chromatic aberrations.

In another embodiment, a method of manufacturing an optical aberration compensation lens includes applying a first heat treatment to a first starting base glass material of a base composition to form a first glass-ceramic material with a first volume filling fraction of one or more first species of nanocrystals configured to compensate for at least one first aberration of at least one first lens.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Disclosed herein is an optical aberration compensation lens using glass-ceramics and a method of making the same. The method of manufacturing the optical aberration compensation lens includes applying at least one heat treatment to a starting base glass material of a base composition (i.e., starting composition) to form a glass-ceramic material with a volume filling fraction of one or more species of nanocrystals. This process is glass composition agnostic and can be applied to generate any glass-ceramic composition formed through controlled nucleation and growth. In certain embodiments, the species and/or volume filling fraction of nanocrystals determines the resulting index of refraction and dispersion characteristic (e.g., constringence). Accordingly, application of different heat treatments (e.g., nucleation temperature and/or growth temperature and/or treatment times of each) to the same starting base glass material produces different glass-ceramic materials with different optical properties (e.g., index of refraction and/or dispersion characteristic).

As used herein, "volume filling fraction" refers to the volume of a constituent (e.g., nanocrystal seeds, crystals, etc.) divided by the volume of the whole (e.g., the constituent and the residual glass).

Figure 2:
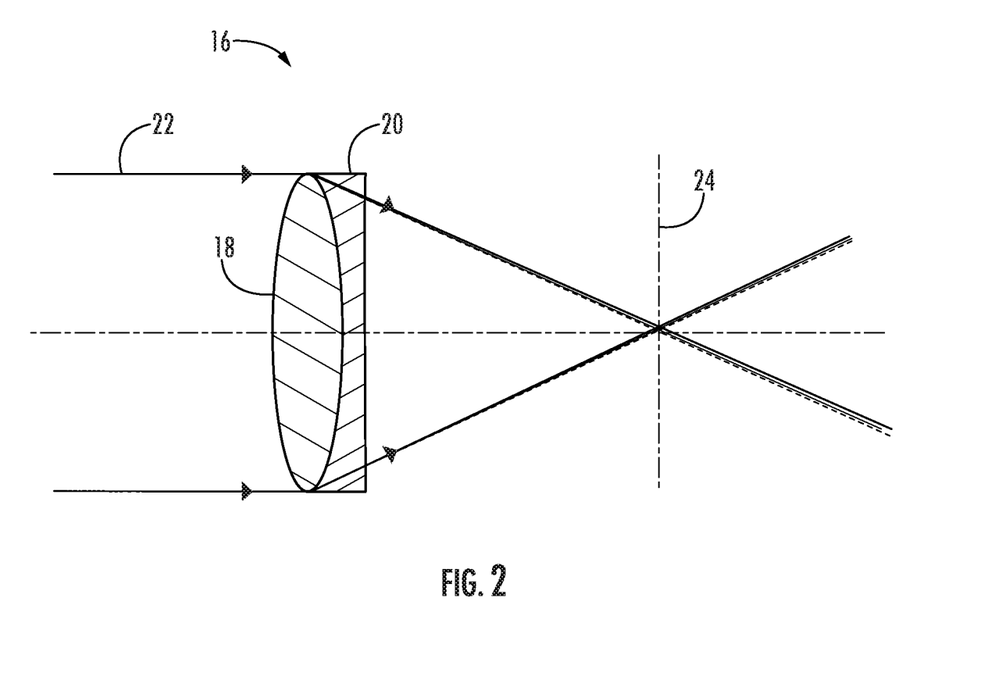
FIG. 2 is a side view of a lens assembly including a first lens and an optical aberration compensation lens to compensate for the chromatic aberration formed by the first lens.

FIG. 2 is a side view of a lens assembly 16 including a first lens 18 and an optical aberration compensation lens 20 (e.g., a dispersion-correction lens) to compensate (e.g., reduce or eliminate) for the aberration (e.g., chromatic aberration, monochromatic aberration, etc.) formed by the first lens 18. In particular, for example, the first lens 18 generates chromatic dispersion such that deviations in the light paths 22 of differing colors propagated through the first lens 18 produce an optical aberration (e.g., a chromatic aberration) at an imaging plane 24 (e.g., an intermediate imaging plane, a focal plane array, etc.). However, the optical aberration compensation lens 20 redirects these light paths so that the light paths of these differing colors are redirected to reduce or eliminate any optical aberration (e.g., chromatic aberration) at the imaging plane 24. As shown, the first lens 18 and the optical aberration compensation lens 20 of FIG. 2 produce far less dispersion at the imaging plane 24 then the lens 10 used in FIG. 1.

In certain embodiments, the first lens 18 includes at least one of an objective lens, an imager, a re-imager, or a telescope. In certain embodiments, the lens assembly 16 includes a doublet made of two lenses paired together, which may allow more optical surfaces, thicknesses, and/or formulations. In certain embodiments, the lens assembly includes a lens subassembly having a plurality of lenses. In such a configuration, the optical aberration compensation lens 20 is configured to compensate (e.g., reduce or eliminate) for the aberration (e.g., chromatic aberration) of the lens subassembly. In other words, the optical aberration compensation lens 20 redirects the light paths to prevent deviations so that the light paths (e.g., of the differing colors) intersect at the imaging plane 24.

In certain embodiments, the glass-ceramic material is transparent (e.g., translucent). In certain embodiments, the glass-ceramic material includes an infrared material configured to transmit infrared wavelengths (e.g., between 1-12 microns), such as at least one of short-wave infrared (SWIR), mid-wave infrared (MWIR), or long-wave infrared (LWIR).

The optical aberration compensation lens 20 includes a glass-ceramic material having a volume filling fraction of one or more species of nanocrystals (e.g., relative to the residual glass) configured to compensate for one or more aberrations (e.g., chromatic or monochromatic (e.g., spherical, coma, astigmatism, etc.)), such as from dispersion of the first lens 18. In certain embodiments, the glass-ceramic material includes a homogenous volume filling fraction of the nanocrystals. In other words, the volume filling fraction is generally the same throughout the optical aberration compensation lens 20. The glass-ceramic material includes optical characteristics including an index of refraction and a dispersion characteristic (e.g., Abbe number, V-number, partial dispersion, constringence, etc.). In certain embodiments, the dispersion characteristic is configured to compensate for the one or more chromatic aberrations. In certain embodiments, the volume filling fraction of the one or more species of nanocrystals is configured to compensate for the one or more chromatic aberrations throughout a band of infrared wavelengths (e.g., between 1-12 microns), such as at least one of SWIR, MWIR, or LWIR. It is noted that the processes and functions described herein can be applied to other spectral regions.

Figure 3:
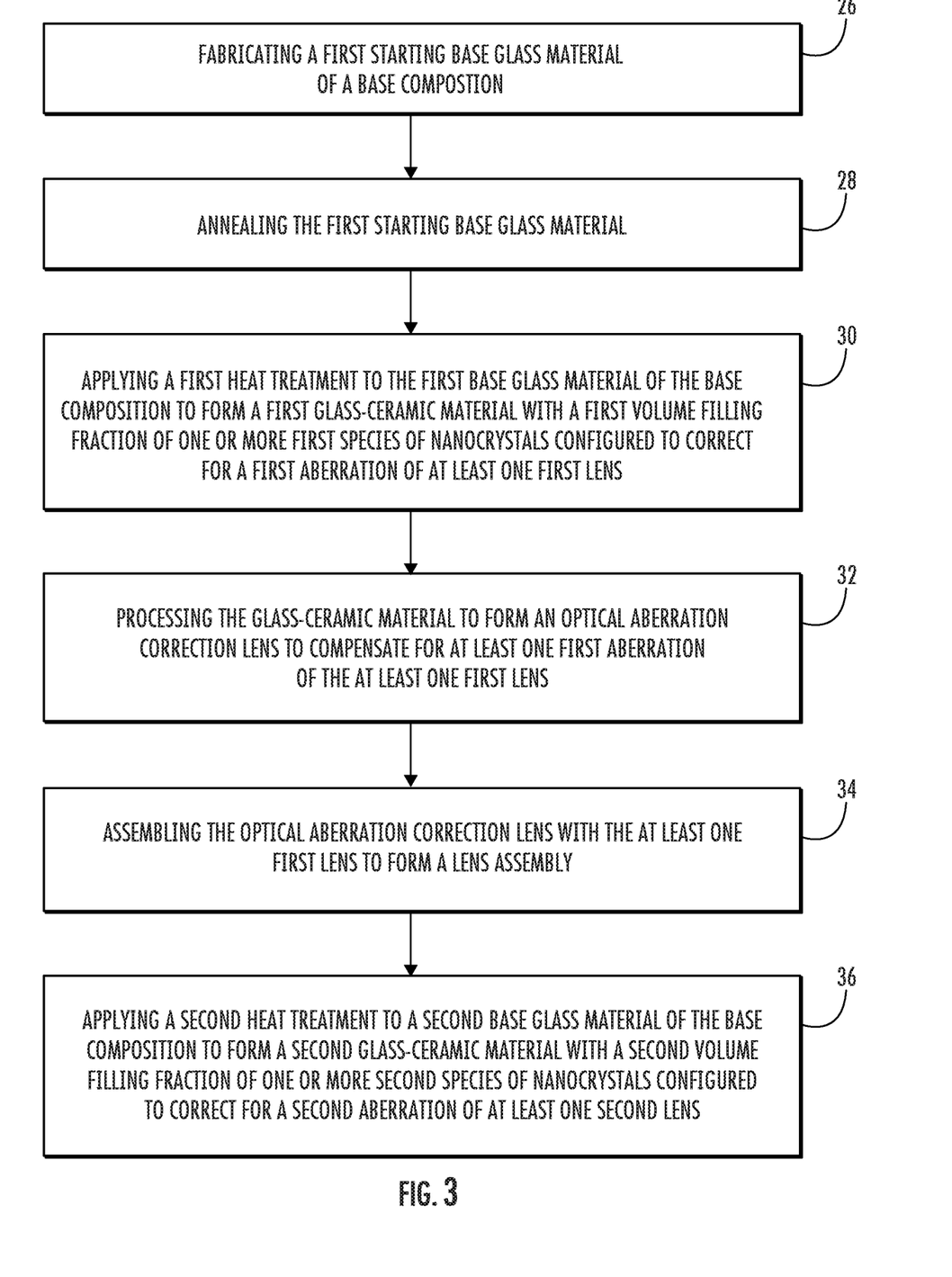
FIG. 3 is a flowchart illustrating a method of manufacturing an optical aberration compensation lens.

FIG. 3 is a flowchart illustrating a method of manufacturing the optical aberration compensation lens 20. In step 26, the method includes fabricating a first starting base glass material of a base composition. In step 28, the method includes annealing the first starting base glass material. Annealing includes heating the first starting base glass material and then cooling slowly to remove internal stresses and toughen the material.

In step 30, the method includes applying a first heat treatment to the first starting base glass material of the base composition to form a first glass-ceramic material with a first volume filling fraction of one or more first species of nanocrystals (e.g., relative to the residual glass) configured to correct for a first aberration (e.g., chromatic aberration from dispersion, monochromatic aberration, etc.) of at least one first lens. This first heat treatment may be applied using a furnace, electricity, and/or laser. In certain embodiments, a furnace is used to apply the first heat treatment to manufacture the first glass-ceramic material in bulk.

In certain embodiments, the first heat treatment includes a nucleation step where heat is applied to a first starting base glass material of a base composition to form a first crystal nuclei with a first volume filling fraction of one or more first species of nanocrystal seeds. In other words, the first heat treatment includes a nucleation heat treatment including nucleating the first starting base glass material at a nucleating temperature and/or time to form nanocrystal seeds. In certain embodiments, the first heat treatment further includes a growth step where heat is applied to the first crystal nuclei to form a first glass-ceramic material with a first volume filling fraction of one or more first species of nanocrystals configured to correct for a first aberration of at least one first lens. In other words, the first heat treatment includes a growth heat treatment including growing one or more species of nanocrystals in the first starting base glass material at a growth temperature and/or time to form the first glass-ceramic material with the first volume filling fraction of the one or more species of nanocrystals.

In certain embodiments, the first glass-ceramic material includes a first index of refraction and a first dispersion characteristic configured to compensate for the first chromatic aberration. In certain embodiments, the first glass-ceramic material is chemically and optically homogenous. Such a configuration facilitates producing the first glass-ceramic material in bulk. In certain embodiments, the first glass-ceramic material includes an infrared material (e.g., an infrared composite material) configured to transmit infrared wavelengths. Accordingly, the infrared material may be made in bulk.

In step 32, the method includes processing the glass-ceramic material to form an optical aberration compensation lens to compensate for at least one first aberration of the at least one first lens. In step 34, the method includes assembling the optical aberration compensation lens with the at least one first lens to form a lens assembly.

In step 36, the method includes applying a second heat treatment to a second starting base glass material of the base composition to form a second glass-ceramic material with a second volume filling fraction of one or more second species of nanocrystals configured to compensate for at least one second aberration (e.g., a chromatic aberration from dispersion, monochromatic aberration, etc.) of at least one second lens. In certain embodiments, the second heat treatment includes a same nucleating heat treatment as the first heat treatment and a different growth heat treatment from the first heat treatment. In certain embodiments, the second heat treatment includes a different nucleating heat treatment and a different growth heat treatment from the first heat treatment. In certain embodiments, the second glass-ceramic material includes a second index of refraction different from the first index of refraction and/or a second dispersion characteristic different from the first dispersion characteristic.

In certain embodiments, the first heat treatment and/or second heat treatment are preconfigured to produce a glass-ceramic material with a predetermined dispersion characteristic (e.g., an index of refraction and/or dispersion) based on a desired optical aberration compensation. In other words, given a known optical aberration compensation of a lens or lens assembly, the heat treatments can be specifically preconfigured to produce a material with dispersion characteristics designed to correct for such known optical aberrations. This is made possible by knowing certain properties of a material and how those properties vary as a function of temperature (e.g., intensity and/or duration). Such properties may include crystal type formation, nucleation rate, and/or crystal growth rate, etc.

Figure 4:
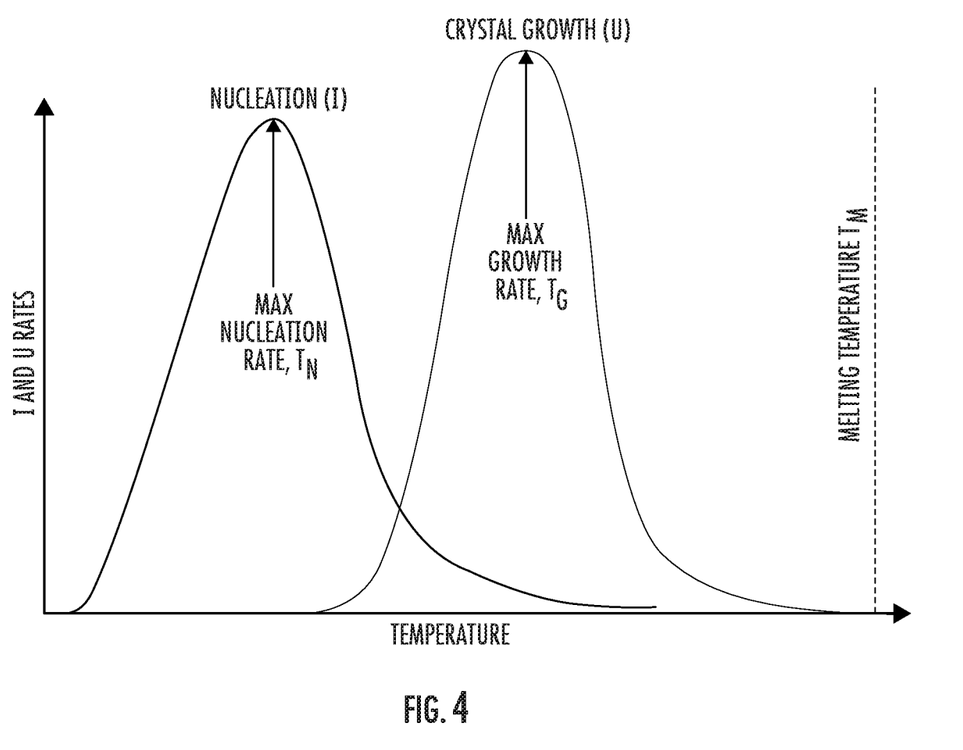
FIG. 4 is a chart illustrating the nucleation rate and crystal growth rate as a function of temperature.

FIG. 4 is a chart illustrating the nucleation rate and crystal growth rate as a function of temperature. The nucleation rate determines the density of nanocrystal seeds. The crystal growth rate determines the growth and volume filling fraction of the different nanocrystals formed during the nucleation step. As a result, by controlling the temperature, the nucleation rate and/or the crystal growth rate are also controllable. In certain embodiments, controlling the crystal growth rate (and using the same nucleation rate) is used to produce a glass-ceramic material with predetermined dispersion characteristics. Knowledge of the crystal growth rates and thus, required heat treatment times defines the resulting volume filling fraction of resulting crystalline phase(s).

Figure 5:
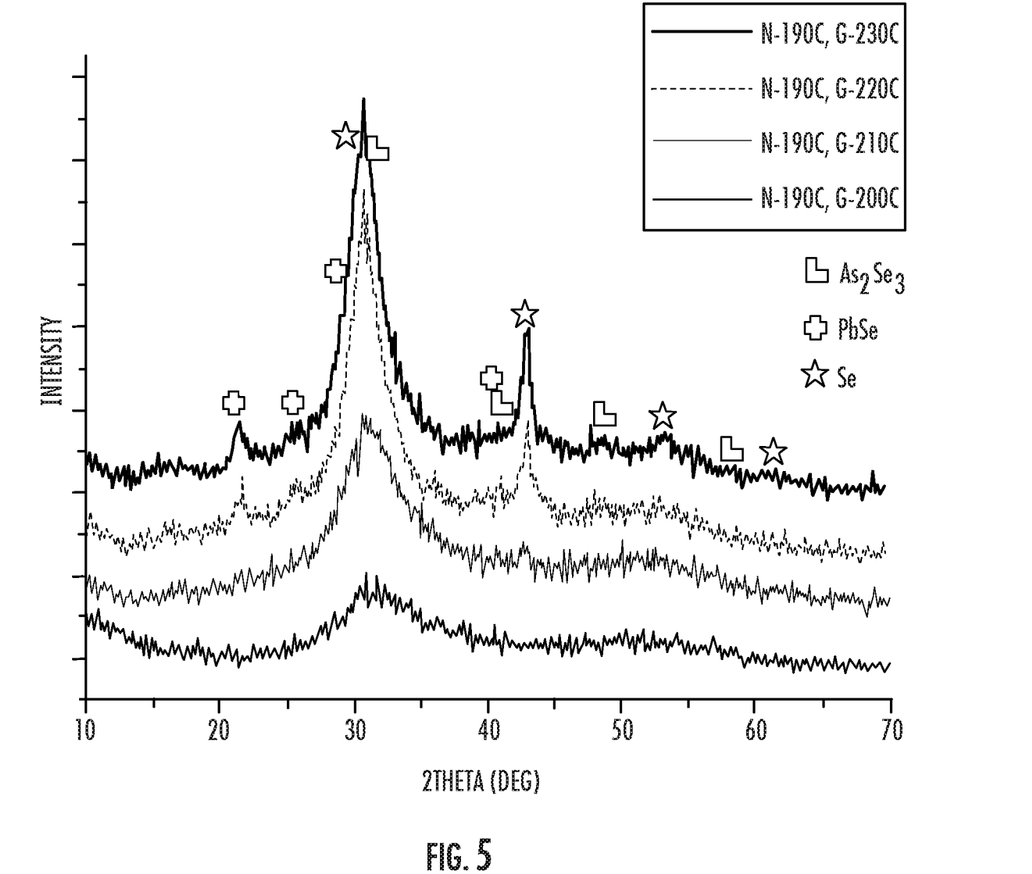
FIG. 5 is a chart illustrating increasing crystal growth rate as the growth temperature increases.

FIG. 5 is a chart illustrating increasing crystal growth rate as the growth temperature increases. As shown, certain types of crystals form in certain volume filling fractions (e.g., densities) at certain temperatures. As a result, by controlling the temperature, the types and/or volume filling fraction are also controllable. Further, the types of crystals and/or the volume filling fraction affects the optical properties of the glass-ceramic material.

Accordingly, knowing the crystal type formation, nucleation rate, and/or crystal growth rate for a given material and/or given various temperatures allows for the production of ceramic-glass materials with predetermined dispersion characteristics.

Figure 6:
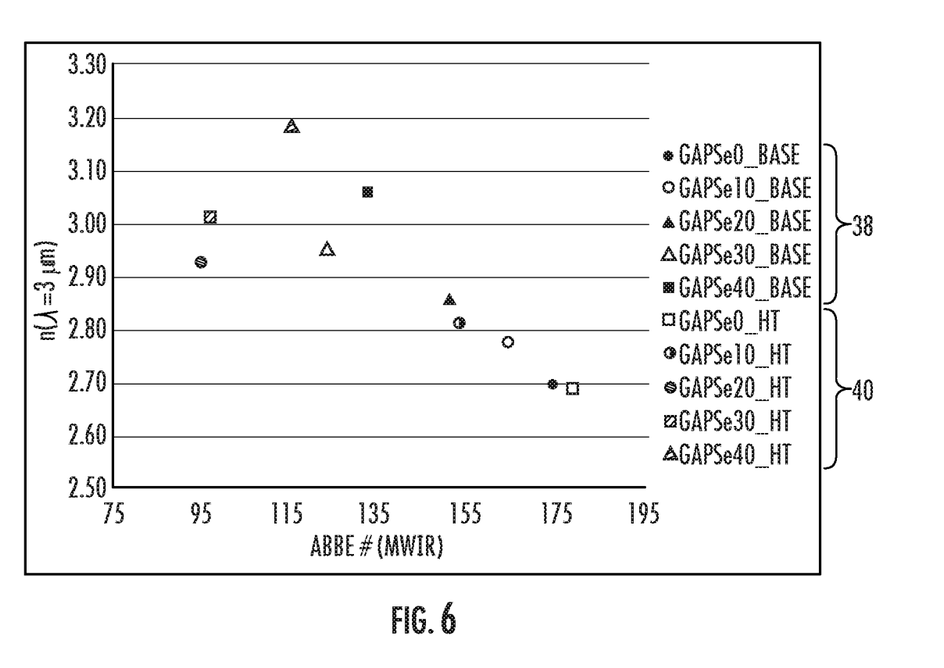
FIG. 6 is a chart illustrating changes in the index of refraction and changes in an Abbe number of various medium wave infrared materials as a result of applying a heat treatment protocol (e.g., a series of heat treatments)

FIG. 6 is a chart (i.e., Abbe diagram) illustrating changes in the index of refraction and changes in an Abbe number (a quantity to describe the dispersion properties of materials) of various medium wave infrared materials as a result of applying varying heat treatments. The chart includes base materials 38 and materials subject to the heat treatments 40. The heat treatments depend on the base glass material's thermal properties, which vary with composition, and the resulting Abbe number is dictated by the heat treatment conditions.

Figure 7:
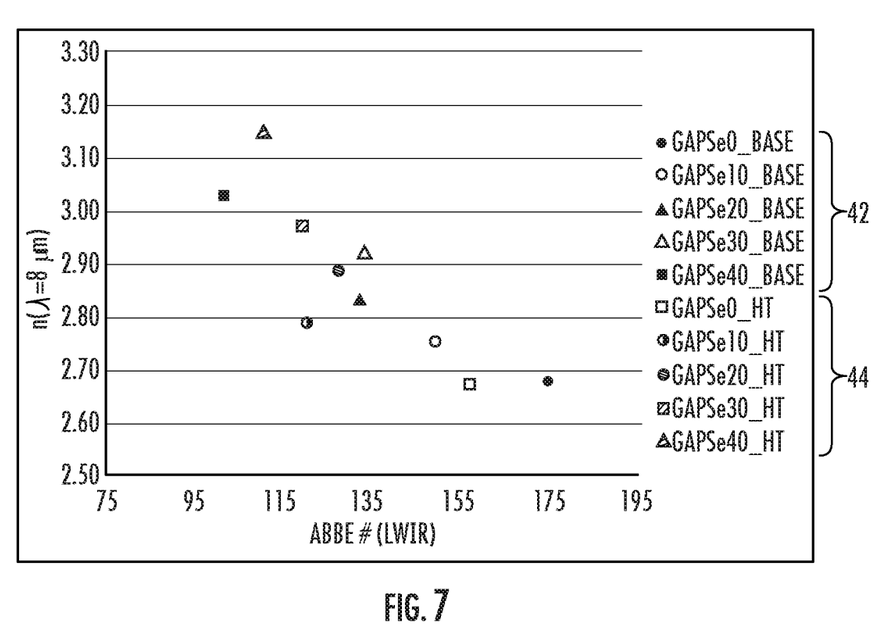
FIG. 7 is a chart illustrating changes in the index of refraction and changes in an Abbe number of various large wave infrared materials as a result of applying a heat treatment protocol (e.g., a series of heat treatments)

FIG. 7 is a chart (i.e., Abbe diagram) illustrating changes in the index of refraction and changes in an Abbe number of various large wave infrared materials as a result of applying varying heat treatments. The chart includes base materials 42 and materials subject to the heat treatments 44. The heat treatments depend on the base glass material's thermal properties, which vary with composition, and the resulting Abbe number is dictated by the heat treatment conditions.

In each of FIGS. 6 and 7, the optical properties (e.g., index of refraction and/or Abbe number) vary by applying different heat treatments (e.g., nucleation temperature and/or growth temperature). In other words, for example, the Abbe number of the resulting heat treated composition varies relative to the Abbe number of the corresponding base composition. Further, depending on the heat treatment, the same base composition produces different compositions with differing Abbe numbers. As a result, a specific heat treatment can be applied to a starting base glass material to achieve differing specific optical characteristics (such as to compensate for chromatic aberrations in a lens (e.g., for infrared wavelengths) of the resulting glass-ceramic material without having to alter the composition of the starting base glass material). This specific heat treatment varies with base glass composition and each glass material's respective thermal properties.

The system and method disclosed herein expands the single point solution of materials subject to heat treatments. This is due to the transformation of a glass-ceramic composition from glass (amorphous phase) to various levels of crystallinity (glass-ceramic), expanding the single dot solution that is currently achievable into enlarged lines, circles, and/or elliptical representations, now achievable with single glass compositions (e.g., infrared glass composition), such as AMTIR glasses, Schott IRG glasses, Umicore materials, or crystalline materials like ZnSe, ZnS, Silicon, Germanium, BaF$_2$, etc.

The broad index variations of these glass-ceramic materials (e.g., infrared glass-ceramic materials) are tailored. As a result, one material can be used (instead of many materials) to compensate for aberrations (e.g., chromatic or monochromatic aberrations), such as from dispersion. In certain embodiments, infrared (IR) materials may be created with better index and dispersion variations. The tailored ceramization process to create different volume filling fractions of crystals and/or different crystal species inside the starting base glass material (e.g., base glass matrix) can be achieved, for example, in a furnace, electrically, and/or optically via a laser.

Figure 8:
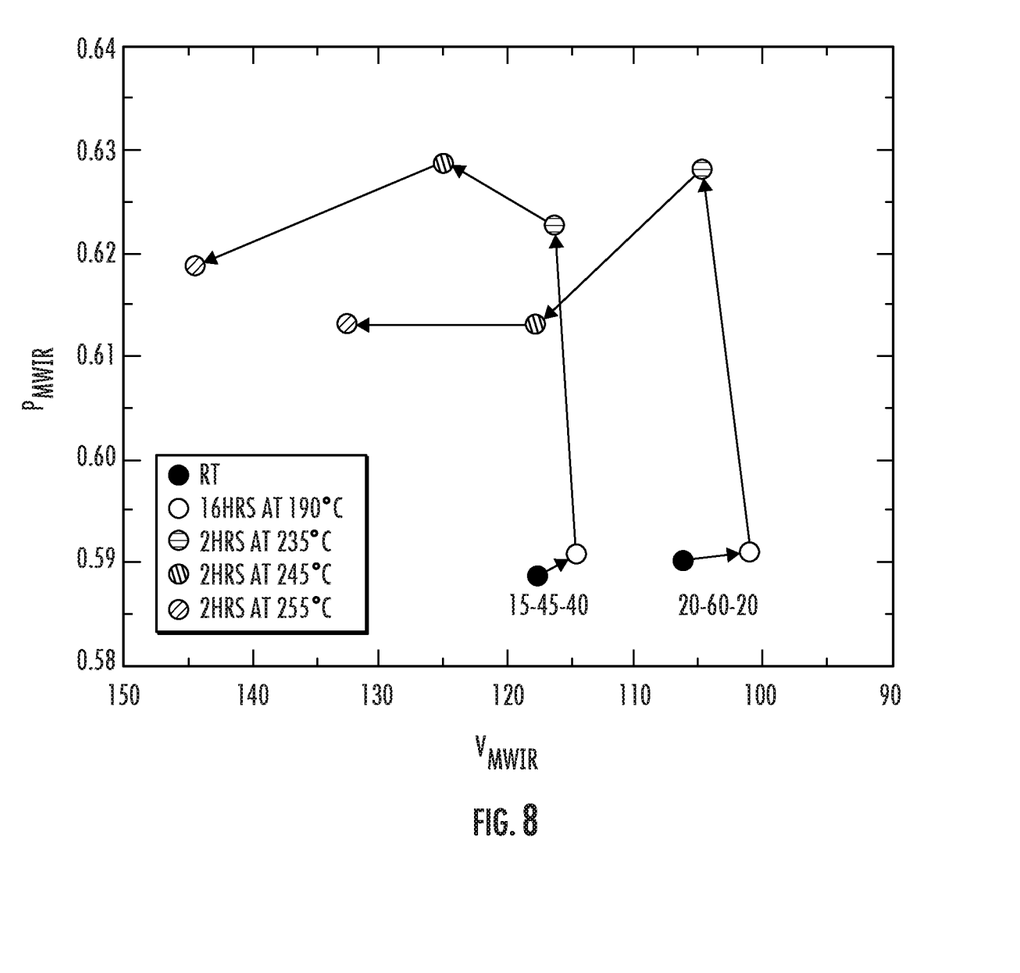
FIG. 8 is a diagram illustrating the tailorability of mid wave infrared (MWIR) index dispersive properties for two representative compositions enabled by cumulative heat treatment protocols.

FIG. 8 shows an example of a sequential, multi-step heat treatment protocol and its impact on the modification of index dispersion in the MWIR. FIG. 8 represents a discrete singular protocol of time and temperature of nucleation and growth and the resulting dispersion in a single glass composition. If the composition changes, the times, temperatures, and dispersion values will also change. In other words, the resulting product is dependent on the time, temperature, and/or composition. Further, the heat treatment can be stopped at any step to obtain a product with specific characteristics, or continue with further steps to obtain a product with different characteristics. This tailored ceramization process is what allows a (generally continuous) linear, circular, and/or elliptical area on the Abbe diagram. Effectively, this increases the number of materials that can be used and paired for lens system design, especially in infrared applications, where the number of commercially available compositions may be very limited due to the high manufacturing costs of making and optimizing infrared compositions.

In certain embodiments, the base material includes GeSe$_2$—As$_2$Se$_3$—PbSe (GAP-Se) glass, which may be used for chromatic correction in all three IR bands (i.e., SWIR, MWIR, LWIR) using heat treatment protocols. This means that modification to the base glass value (through a change to either the nucleation, growth time, and/or temperature) will alter the Abbe number and/or refractive index of the glass ceramic material.

In certain embodiments, the Abbe numbers in the ranges of SWIR, MWIR, and LWIR decrease with the addition of PbSe up to a level of about 25-30 mol % PbSe. The Abbe number may be significantly reduced (and the dispersion higher) when Pb is a dominant species in the matrix of the parent glass. The dispersion further decreases upon heat treatment and is impacted by the types of crystals formed. The Pb-content variation in the GAP-Se glass series may provide a range of Abbe numbers for the optical designer to choose from for chromatic correction. In the paraxial regime, the axial chromatic aberration may be mitigated with a doublet when the magnitude of the Abbe number difference between the two lenses is maximized.

In certain embodiments, controlled nucleation and growth can be used to create a desired profile. For example, in certain embodiments, quantified induced optical modification and function, as quenched and nucleated, 20 mol % PbSe GAP-Se glass undergoes heat treatment (growth) within a furnace (e.g., between 225.6-263.2° C.). In certain embodiments, the heat treatment protocol induces a refractive index of about 0.2 and a MWIR Abbe number of about 35. In certain embodiments, the heat treatment protocol results in a refractive index between 0.1 and 0.9, between 0.1 and 0.5, between 0.1 and 0.3. In certain embodiments, the Abbe number is between 1 and 50, between 10 and 40, between 30 and 40.

Figure 9:
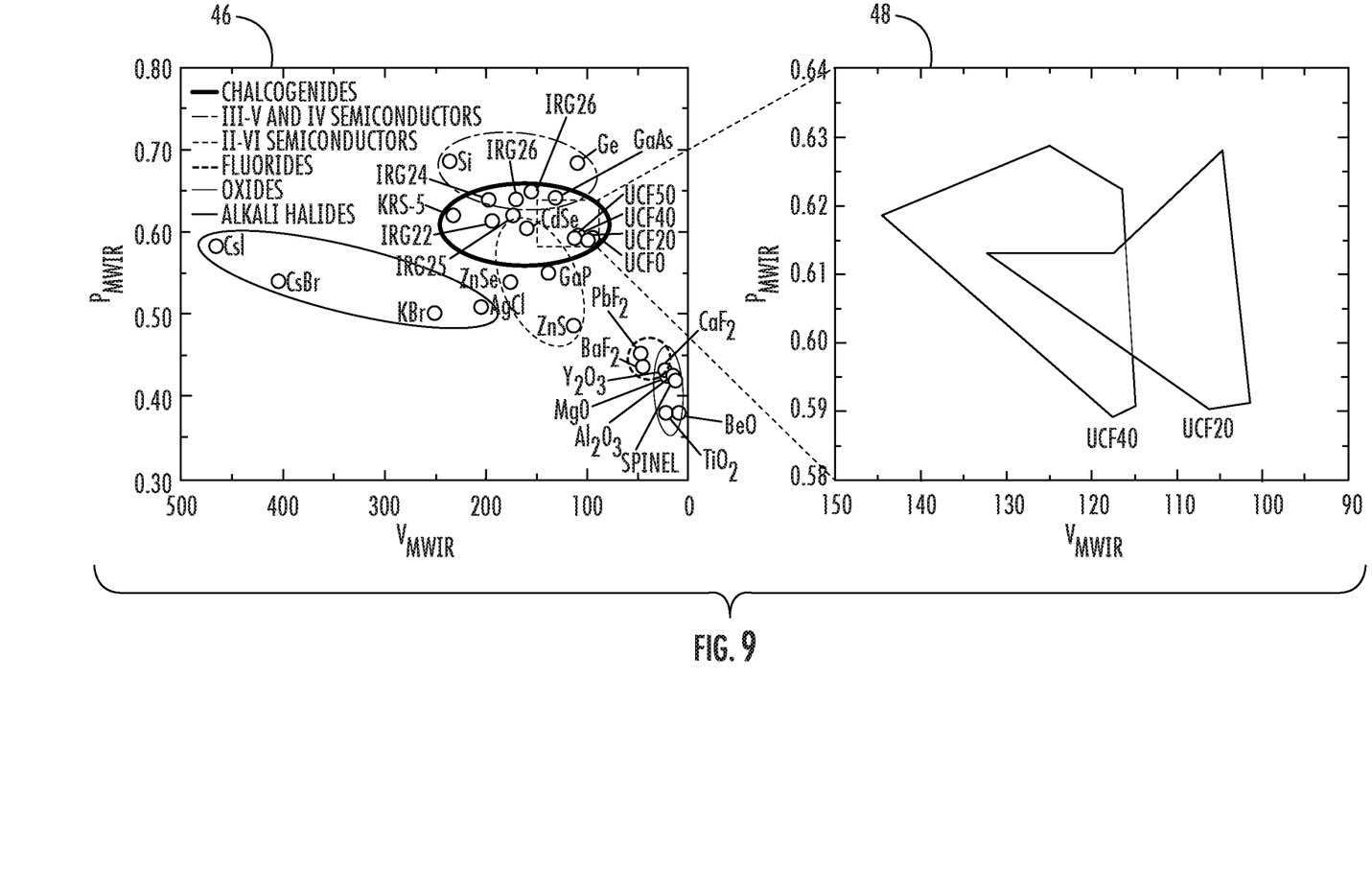
FIG. 9 illustrates a refractive index dispersion map of dispersion engineering enabled by processes disclosed herein.

FIG. 9 shows a refractive index dispersion map illustrating dispersion engineering by processes disclosed herein. In particular, the refractive index dispersion map 46 includes groups of optical and IR materials including chalcogenides, III-V and IV semiconductors, II-VI semiconductors, fluorides, oxides, and alkali halides. To correctly represent the curvature of index dispersion along two orthogonal directions in a 2-D space, the map is constructed by Abbe number and partial refractive index.

It is noted that the Abbe numbers may be calculated as follows:

$$SWIR\ Abbe\ number = V_{SWIR} = \left(\frac{n_{2.0\mu m} - 1}{n_{1.6\mu m} - n_{2.4\mu m}}\right)$$

$$MWIR\ Abbe\ number = V_{MWIR} = \left(\frac{n_{4\mu m} - 1}{n_{3\mu m} - n_{5\mu m}}\right)$$

$$LWIR\ Abbe\ number = V_{LWIR} = \left(\frac{n_{10\mu m} - 1}{n_{8\mu m} - n_{12\mu m}}\right)$$

where $n_\lambda$ corresponds to effective refractive indices of a material at various wavelengths.

The MWIR partial refractive index is defined by the following equation:

$$MWIR\ partial\ refractive\ index = P_{MWIR} = \frac{n_{3\mu m} - n_{4\mu m}}{n_{3\mu m} - n_{5\mu m}}$$

The map illustrates that each group of materials can be characterized by specific locations due to intrinsically-similar electronic structures and resulting light-matter interactions within each group. However, most material systems have a single $V_{MWIR}$-$P_{MWIR}$ signature, indicating that the materials are bound to very narrow ranges of dispersion. Unlike these homogenous optical materials, the dispersive nature of the GAP-Se system shown herein can be simply tuned by converting it to a glass-ceramic optical composite. Variation in the extent of crystal phase formation allows altering the composite's effective index and dispersion.

Subsection 48 illustrates tunability of dispersive properties for GAP-Se upon heat treatment where the polygons correspond to the ranges of $V_{MWIR}$-$P_{MWIR}$ values enabled by heat treatment protocols applied to two exemplary compositions including 20 mol % and 40 mol % PbSe. In certain embodiments, alternative protocols may translate or expand the polygons, further widening the dispersion tunability.

The tailored ceramization process discussed herein provides a single composition that can provide a range of refractive indices and dispersion values. This alleviates the fabrication cost of multiple compositions, as the ceramization process is less costly and time consuming than the base glass fabrication process. The tailored ceramization process opens up the list of available material pairs for system designs (e.g., infrared systems) and/or makes such system designs more compact (e.g., with fewer optical elements). In certain embodiments, this may reduce the size, weight, power, and/or cost of infrared systems. This can additionally be made into GRIN components following GRIN processes.

Instead of making multiple compositions (e.g., GAP-Se0, GAP-Se10, GAP-Se20, GAP-Se30, and GAP-Se40), the system and method of the present disclosure allows manufacture of one bulk material (e.g., starting base glass material) and then changing the index of refraction and/or the dispersion characteristic (e.g., Abbe number) of that one bulk material. This provides more degrees of freedom for optical designers (e.g., to achieve short, mid, and/or long wave achromats). In other words, for example, one bulk material can be made, and then 1,000 different heat treatments can be applied, to produce 1,000 different glass ceramic materials, each having different optical properties (e.g., different refractive index and/or dispersion characteristic combinations) and/or each having the same or similar thermomechanical properties. It is noted that the heat treatment (e.g., homogenous heat treatment) is applied over the entire bulk material. In certain embodiments the bulk material is chemically and optically homogenous, and the glass ceramic material is chemically and optically heterogeneous.

Incorporated by reference is Sisken, et al., "Infrared Glass—Ceramics with Multidispersion and Gradient Refractive Index Attributes," Adv. Funct. Mater. 2019, 29, 1902217. Also incorporated by reference is Kang, et al., "Monolithic Chalcogenide Optical Nanocomposites Enable Infrared System Innovation: Gradient Refractive Index Optics," Adv. Optical Mater. 2020, 8, 2000150.

Those skilled in the art will recognize improvements and modifications to the preferred embodiments of the disclosure. All such improvements and modifications are considered within the scope of the concepts disclosed herein and the claims that follow.

What is claimed is:

1. An optical aberration compensation lens, comprising:
    a glass-ceramic material having a volume filling fraction of one or more species of nanocrystals configured to compensate for at least one aberration of at least one lens, wherein the glass-ceramic material comprises an index of refraction and a dispersion characteristic configured to compensate for the at least one aberration, wherein the at least one aberration comprises one or more chromatic aberrations.

2. The optical aberration compensation lens of claim 1, wherein the glass-ceramic material is chemically and optically homogenous.

3. The optical aberration compensation lens of claim 2, wherein the glass-ceramic material comprises a homogenous volume filling fraction of the one or more species of nanocrystals.

4. The optical aberration compensation lens of claim 1, wherein the glass-ceramic material comprises an infrared material configured to transmit infrared wavelengths.

5. The optical aberration compensation lens of claim 4, wherein the infrared material is configured to transmit infrared wavelengths of at least one of short-wave infrared, mid-wave infrared, or long-wave infrared.

6. The optical aberration compensation lens of claim 5, wherein the volume filling fraction of the one or more species of nanocrystals is configured to compensate for the one or more chromatic aberrations throughout a band of infrared wavelengths of at least one of short-wave infrared, mid-wave infrared, or long-wave infrared.

7. A lens assembly, comprising:
    the at least one lens; and
    the optical aberration compensation lens of claim 1.

8. The lens assembly of claim 7, wherein the at least one lens comprises an objective lens, an imager, a re-imager, or a telescope.

9. A method of manufacturing an optical aberration compensation lens, comprising:
    applying a first heat treatment to a first starting base glass material of a base composition to form a first glass-ceramic material with a first volume filling fraction of one or more first species of nanocrystals configured to compensate for at least one first aberration of at least one first lens, wherein the first glass-ceramic material comprises a first index of refraction and a first dispersion characteristic configured to compensate for the at least one first aberration, wherein the at least one first aberration comprises one or more chromatic aberrations.

10. The method of claim 9, wherein the first glass-ceramic material comprises an infrared material configured to transmit infrared wavelengths.

11. The method of claim 9, further comprising:
    fabricating the first starting base glass material of the base composition; and
    annealing the first starting base glass material.

12. The method of claim 9, wherein the first heat treatment comprises a nucleating heat treatment including nucleating the first starting base glass material at a nucleating temperature to form nanocrystal seeds.

13. The method of claim 9, wherein the first heat treatment comprises a growth heat treatment including growing one or more species of nanocrystals in the first starting base glass material at a growth temperature to form the first glass-ceramic material with the first volume filling fraction of the one or more first species of nanocrystals.

14. The method of claim 9, further comprising processing the glass-ceramic material to form the optical aberration compensation lens to compensate for the at least one first aberration of the at least one first lens.

15. The method of claim 9, further comprising assembling the optical aberration compensation lens with the at least one first lens to form a lens assembly.

16. The method of claim 9, further comprising applying a second heat treatment to a second starting base glass material of the base composition to form a second glass-ceramic material with a second volume filling fraction of one or more second species of nanocrystals configured to compensate for at least one second aberration of at least one second lens.

17. The method of claim 16, wherein the second heat treatment includes a same nucleating heat treatment as the first heat treatment and a different growth heat treatment from the first heat treatment.

18. The method of claim 16, wherein the second heat treatment includes a different nucleating heat treatment and a different growth heat treatment from the first heat treatment.

19. The method of claim 16,
    wherein the second glass-ceramic material comprises a second index of refraction different from the first index of refraction of the first glass-ceramic material and a second dispersion characteristic different from the first dispersion characteristic of the first glass-ceramic material.

* * * * *